US009472929B2

(12) United States Patent
Rossman et al.

(10) Patent No.: US 9,472,929 B2
(45) Date of Patent: Oct. 18, 2016

(54) CABLE ASSEMBLY HAVING A GROUNDED CABLE HARNESS

(71) Applicant: Tyco Electronics Corporation, Berwyn, PA (US)

(72) Inventors: Jared Evan Rossman, Dover, PA (US); Julia Anne Lachman, York, PA (US); Jeffrey Stewart Simpson, Mechanicsburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 161 days.

(21) Appl. No.: 14/454,507

(22) Filed: Aug. 7, 2014

(65) Prior Publication Data

US 2016/0043507 A1    Feb. 11, 2016

(51) Int. Cl.
| | |
|---|---|
| *H01R 13/646* | (2011.01) |
| *H02G 3/04* | (2006.01) |
| *H01R 4/04* | (2006.01) |
| *H01R 9/03* | (2006.01) |
| *H01R 13/6592* | (2011.01) |
| *H01R 13/6599* | (2011.01) |

(52) U.S. Cl.
CPC .............. *H02G 3/0406* (2013.01); *H01R 4/04* (2013.01); *H01R 9/032* (2013.01); *H01R 13/6592* (2013.01); *H01R 13/6599* (2013.01); *H01R 2201/04* (2013.01)

(58) Field of Classification Search
CPC . H01R 13/646; H01R 4/5025; H02G 3/0406
USPC .......... 439/607.41, 941, 942, 445, 498, 501, 439/701, 460; 174/72 A
See application file for complete search history.

(56) References Cited

U.S. PATENT DOCUMENTS

| | | | |
|---|---|---|---|
| 7,188,415 B2 * | 3/2007 | Robinson | G02B 6/4471 174/154 |
| 2002/0002005 A1 | 1/2002 | Whybrow | |

(Continued)

FOREIGN PATENT DOCUMENTS

| | | |
|---|---|---|
| DE | 102009049133 | 5/2010 |
| WO | 9108961 | 5/1991 |

OTHER PUBLICATIONS

"Turbo Twin ™ Parallel Pair", Tyco Electronics, Madison Cable, Worcester, MA, USA, 2012.

(Continued)

*Primary Examiner* — Edwin A. Leon (57) ABSTRACT

Cable assembly including a cable harness having insulated wires, a shielding layer that surrounds the insulated wires, and a protective jacket that surrounds the shielding layer. The shielding layer includes an exposed portion that clears an end of the protective jacket. The cable assembly also includes an assembly housing having an internal cavity and a loading passage that provides access to the internal cavity. The exposed portion of the shielding layer is positioned within the loading passage. The insulated wires extend through the internal cavity and are terminated to corresponding electrical contacts of a contact assembly. The cable harness includes an adhesive layer that is coupled to the exposed portion. The adhesive layer is engaged with an interior surface of the assembly housing along the loading passage. The adhesive layer includes a conductive thermoplastic material that electrically couples the shielding layer to the assembly housing.

20 Claims, 6 Drawing Sheets

(56) References Cited

U.S. PATENT DOCUMENTS

| | | | |
|---|---|---|---|
| 2006/0035522 A1* | 2/2006 | Kuroda | H01R 9/032 439/607.41 |
| 2009/0068890 A1* | 3/2009 | Horiuchi | H01R 4/20 439/607.41 |
| 2014/0051295 A1 | 2/2014 | Westman et al. | |

OTHER PUBLICATIONS

"Introducing High Speed Cable for Consumer Products", TE Connectivity, te.com/industry/personal-computers, Tyco Electronics Corporation, 2012.

European Search Report dated Nov. 24, 2015 received in counterpart EP Application No. 15179882.4.

* cited by examiner

CABLE ASSEMBLY HAVING A GROUNDED CABLE HARNESS

BACKGROUND

The subject matter herein relates generally to cable assemblies that include cable harnesses for interconnecting communication systems or devices.

Communication systems, such as routers, servers, switches, redundant arrays of inexpensive disks (RAIDs), uninterruptible power supplies (UPSs), host bus adapters (HBAs), supercomputers, and the like, may be large complex systems that have a number of components interconnected to one another through different types of cable assemblies. For example, cable backplane (or cable midplane) systems include several daughter card assemblies that are interconnected to one another through cable assemblies. The daughter card assemblies of such systems may also be interconnected with remote components or devices through different types of cable assemblies. An example of such cable assemblies includes pluggable input/output (I/O) cable assemblies. Pluggable I/O cable assemblies may be configured for various industry standards, including small-form factor pluggable (SFP), enhanced SFP (SFP+), quad SFP (QSFP), C form-factor pluggable (CFP), and 10 Gigabit SFP, which is often referred to as XFP. Other standardized cable assemblies include serial attached (SA) small computer system interface (SCSI) cable assemblies, which may also be referred to as SAS cable assemblies.

Cable assemblies may include a cable harness (or multi-core cable) and two or more cable connectors that are interconnected through the cable harness. The cable harness includes multiple individual cables having corresponding conductors. By way of example, the individual cables may include twisted-pair cables or twin-axial cables. The cable harness may also include a shielding layer that surrounds the individual cables and a protective jacket that surrounds shielding layer. Each of the conductors of the individual cables is terminated to a corresponding electrical contact of a cable connector. Cable assemblies may also include an assembly housing that surrounds the cable connector and a ferrule that is coupled to the assembly housing and the cable harness. The ferrule may crimp the shielding layer of the cable harness to electrically couple the shielding layer to the assembly housing.

For many cable assemblies, the ferrule is typically fed onto the cable harness before the assembly housing is constructed. For some cable assemblies, however, it may be undesirable or impossible to position the ferrule onto the cable harness before constructing the assembly housing. In addition to this challenge, the shielding layer may be cut and spread (or flared) outward to cover a cable exit of the assembly housing. The spreading of the shielding layer may create gaps that decrease the effectiveness of the shielding layer.

A need remains for a cable assembly having a cable harness that is more reliably grounded to a housing of the cable assembly.

BRIEF DESCRIPTION

In an embodiment, a cable assembly is provided that includes a contact assembly having electrical contacts that are configured to engage respective contacts of a mating connector during a mating operation. The cable assembly also includes a cable harness having insulated wires, a shielding layer that surrounds the insulated wires, and a protective jacket that surrounds the shielding layer. The shielding layer includes an exposed portion that clears an end of the protective jacket. The cable assembly also includes an assembly housing having an internal cavity and a loading passage that provides access to the internal cavity. The exposed portion of the shielding layer is positioned within the loading passage. The insulated wires extend through the internal cavity and are terminated to corresponding electrical contacts of the contact assembly. The cable harness includes an adhesive layer that is coupled to the exposed portion of the shielding layer. The adhesive layer is engaged with an interior surface of the assembly housing along the loading passage. The adhesive layer includes a conductive thermoplastic material that electrically couples the shielding layer to the assembly housing.

In an embodiment, a cable harness is provided that includes a plurality of insulated wires, a shielding layer that surrounds the insulated wires, and a protective jacket that surrounds the shielding layer. The shielding layer includes an exposed portion that clears an end of the protective jacket. The insulated wires project beyond an end of the shielding layer for terminating to corresponding electrical contacts. The cable harness also includes an adhesive layer that is coupled to the exposed portion of the shielding layer. The adhesive layer includes a conductive thermoplastic material.

DETAILED DESCRIPTION

Figure 1:
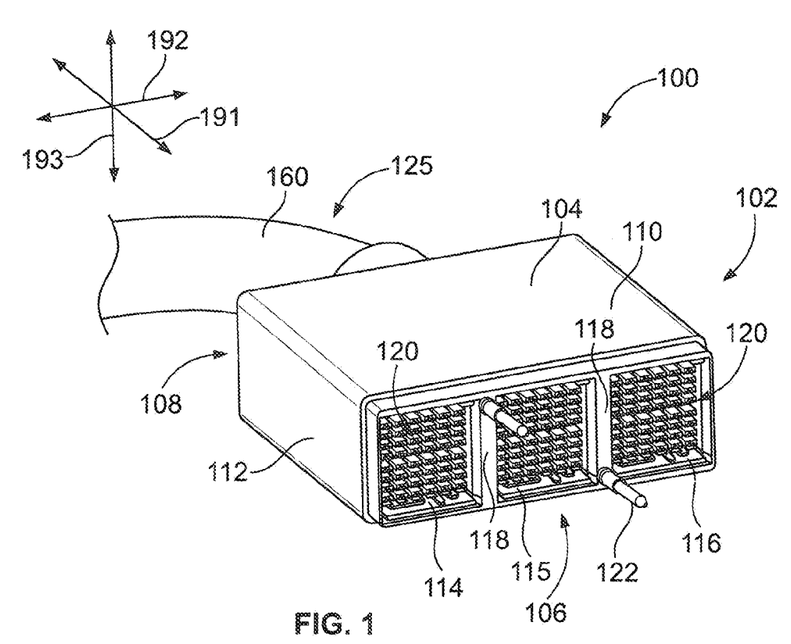
FIG. 1 illustrates a cable assembly formed in accordance with an embodiment and, in particular, shows a mating end of a communication device of the cable assembly.
Figure 2:
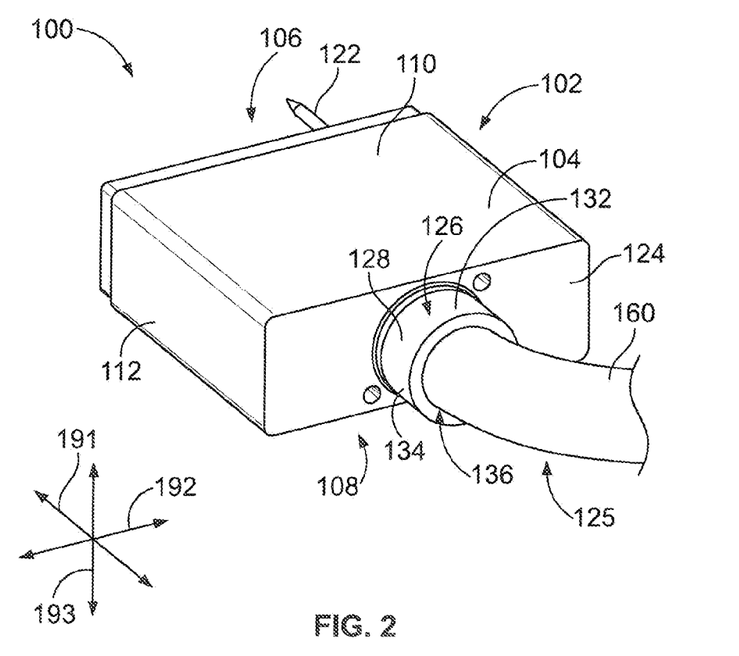
FIG. 2 is a perspective view showing a loading end of the communication device of the cable assembly of FIG. 1.

FIGS. 1 and 2 are perspective views of a cable assembly 100 having a communication device 102 and a cable harness 125 that is coupled to the communication device 102. FIG. 1 shows a front perspective view of the communication device 102, and FIG. 2 shows a rear perspective view of the communication device 102. The cable harness 125 interconnects the communication device 102 to a remote device or devices (not shown). In particular embodiments, the cable harness 125 has a length that is between about a half meter to about ten meters, but embodiments with other lengths are also possible. The remote device may be similar to the communication device 102 or may be a different type of communication device. The cable harness 125 is configured to hold numerous insulated wires 244 (shown in FIG. 6) for transmitting data signals between the communication device 102 and the remote device(s). As described below, the cable harness 125 is also electrically coupled to or grounded to an assembly housing 104 of the communication device 102. The cable harness 125 may also be referred to as a wire harness, a multicore cable, or multicore cabling.

Figure 6:
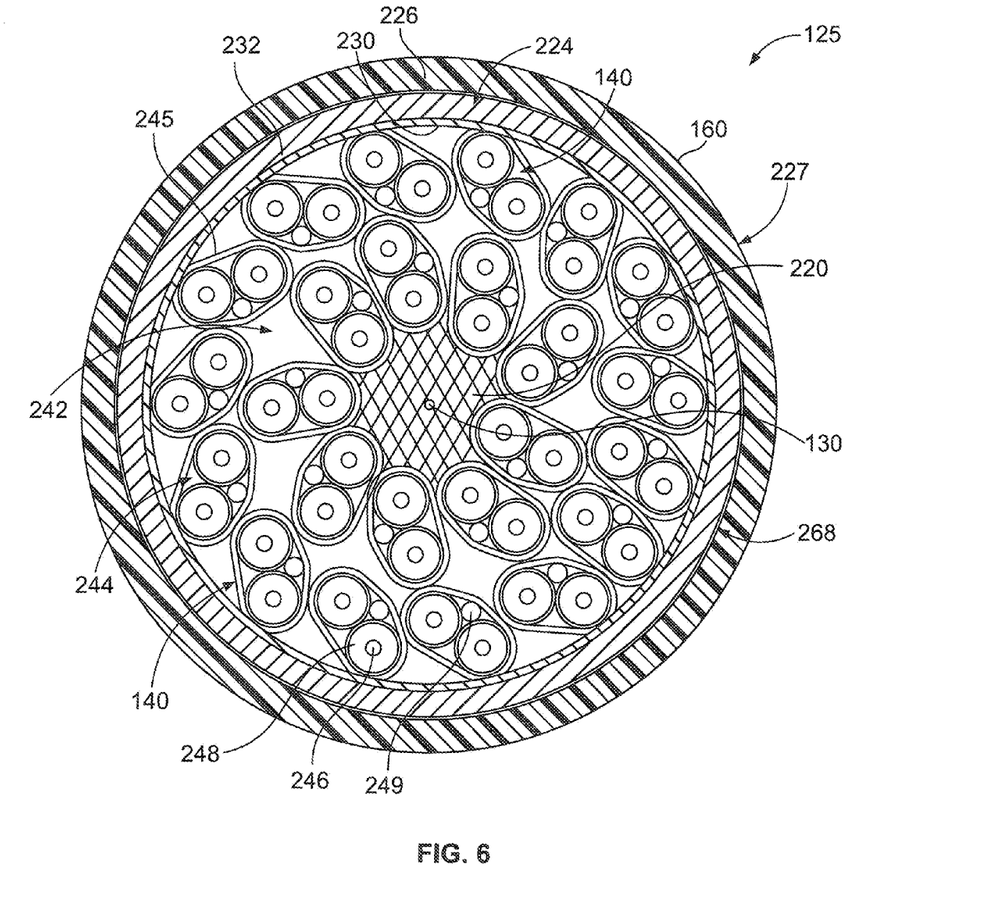
FIG. 6 illustrates a cross-section of a cable harness that may be used with the cable assembly of FIG. 1.

The assembly housing 104 is configured to surround electrical components of the communication device, such as cable connectors 114, 115, 116 (FIG. 1) and the insulated wires 244 (FIG. 6). The assembly housing 104 may include a conductive material. For example, the assembly housing 104 may be shaped from a dielectric material having conductive elements or fillers. Alternatively, the assembly housing 104 may be plated with a conductive material. The assembly housing 104 may also be referred to as a device housing or a backshell in some embodiments.

The assembly housing 104 has a mating side 106 and a loading side 108 that face in opposite directions. The communication device 102 is oriented with respect to mutually perpendicular axes 191, 192, 193, which include a mating axis 191, a lateral axis 192, and an orientation axis 193. During a mating operation, the mating side 106 is configured engage another communication device (not shown) along the mating axis 191. The communication device 102 may be moved along the mating axis 191 and/or the other communication device may be moved along the mating axis 191 to engage the communication device 102. For some applications, the communication device 102 may be mounted to a system panel or wall for receiving the other communication device.

In the illustrated embodiment, the assembly housing 104 includes first and second housing shells 110, 112 that are joined together to form the assembly housing 104. The assembly housing 104 holds the cable connectors 114-116 of the communication device 102 at designated positions along the mating side 106. In the illustrated embodiment, the cable connectors 114-116 are spaced apart from one another along the lateral axis 192 and are separated by spacer walls 118 (FIG. 1). The cable connectors 114-116 include respective contact assemblies 120 that are configured to mate with corresponding contact assemblies (not shown) of the other communication device (not shown). Optionally, the communication device 102 may include alignment posts 122 that project from the mating side 106 of the assembly housing 104.

In an exemplary embodiment, the cable connectors 114-116 are identical to one another, but other embodiments may include different configurations or types of cable connectors. By way of example, the cable connectors 114-116 may be STRADA Whisper connectors, commercially available from TE Connectivity, Harrisburg, Pa. In an exemplary embodiment, the cable connectors 114-116 are high speed differential pair cable connectors that include a plurality of differential pairs of conductors. The cable assembly 100 may be capable of transmitting at least about four (4) gigabits per second (Gbps), at least about 10 Gbps, at least about 20 Gbps, or at least about 40 Gbps. In other embodiments, the cable assembly 100 does not include multiple cable connectors. Instead, the cable assembly 100 may include only a single cable connector.

As shown in FIG. 2, the loading side 108 has an exterior back wall 124 and a cable port 126 that is coupled to the back wall 124. The cable port 126 may have a port wall 128 of the assembly housing 104 that projects from the back wall 124. The port wall 128 defines a loading passage 136 that provides access to an internal cavity 254 (shown in FIG. 7). The cable harness 125 includes an internal segment 256 (shown in FIG. 7) that is positioned in the loading passage 136 within the assembly housing 104. The cable harness 125 also includes an external segment 160 that is located outside of the assembly housing 104.

The cable harness 125 has a central axis 130 (shown in FIGS. 6 and 8) that represents a line extending through a center of the cable harness 125 as the cable harness 125 extends between the communication device 102 and the remote device. The port wall 128 may extend around the central axis 130 when the cable harness 125 is held within the loading passage 136. In the illustrated embodiment, the port wall 128 comprises first and second wall portions 132, 134 that are formed by the first and second housing shells 110, 112, respectively.

Figure 3:
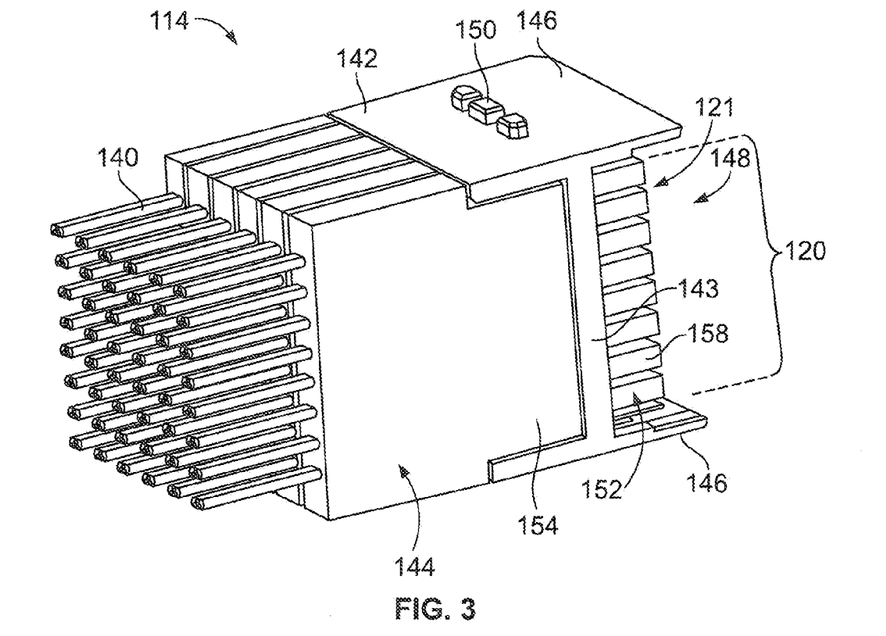
FIG. 3 is a side perspective view of a cable connector that may be used with the cable assembly of FIG. 1.
Figure 4:
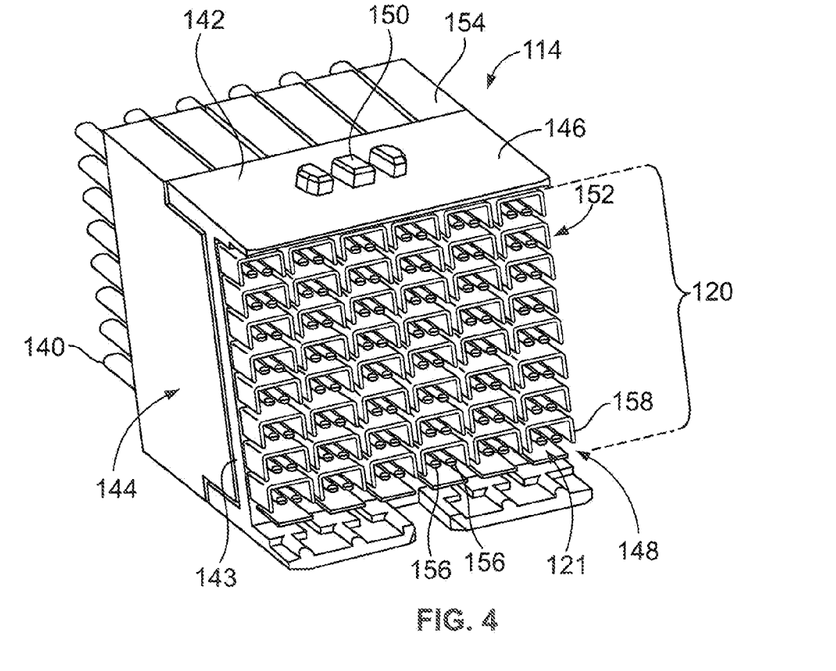
FIG. 4 is a front perspective view of a cable connector that may be used with the cable assembly of FIG. 1.

FIGS. 3 and 4 illustrate different perspective views of the cable connector 114. The cable connectors 115, 116 (FIG. 1) may be similar or identical to the cable connector 114. The cable connector 114 is coupled to a plurality of individual communication cables 140. The cable connector 114 includes a connector body or housing 142 that holds the contact assembly 120. For instance, in the illustrated embodiment, the connector body 142 holds a plurality of contact modules 144 that each include a portion of the contact assembly 120. The connector body 142 includes a base wall 143 and shroud walls 146 that extend from the base wall 143 to define a mating cavity or space 148 therebetween. The mating cavity 148 is configured to receive a portion of the other communication device (not shown). For example, the cable connector 114 may be configured to engage a corresponding mating connector (not shown). The shroud walls 146 may guide mating of the mating connector with the cable connector 114. In an exemplary embodiment, the connector body 142 has lugs 150 extending outward from the shroud walls 146. The lugs 150 are used to locate the cable connector 114 with respect to the assembly housing 104 (FIG. 1).

The contact assembly 120 includes electrical contacts 121 that may be arranged to form a plurality of contact sub-assemblies 152. In some embodiments, the contact assembly 120 may be characterized as a contact array of the electrical contacts 121. For example, each of the contact modules 144 includes a plurality of contact sub-assemblies 152 and a support body 154 that holds the contact sub-assemblies 152 of the corresponding contact module 144. The electrical contacts 121 of each contact sub-assembly 152 include a pair of signal contacts 156 (FIG. 4) and a ground contact (or ground shield) 158. Each of the signal contacts 156 may be terminated to a corresponding signal conductor 246 (shown in FIG. 6) of the individual communication cables 140. In an exemplary embodiment, the ground contact 158 peripherally surrounds the signal contacts 156 along a length of the signal contacts 156 to ensure that the signal paths are electrically shielded from interference.

The support body 154 provides support for the contact sub-assemblies 152. The communication cables 140 extend into the corresponding support body 154 such that the support body 154 holds a portion of the communication cables 140. The support body 154 may provide strain relief for the communication cables 140. Optionally, the support body 154 may be manufactured from a plastic material. Alternatively, the support body 154 may be manufactured from a metal material. The support body 154 may be a metalized plastic material to provide additional shielding for the communication cables 140 and the contact sub-assemblies 152. Optionally, the support body 154 may include a metal plate electrically connected to each ground contact 158 to electrically common each ground contact 158. The support body 154 may also include a dielectric material that is overmolded around the communication cables 140 and portions of the metal plate to support the communication cables 140 and the contact sub-assemblies 152.

In an exemplary embodiment, multiple contact modules 144 may be loaded into the connector body 142. The connector body 142 holds the contact modules 144 in parallel such that the contact sub-assemblies 152 are aligned in parallel columns. Any number of contact modules 144 may be held by the connector body 142 depending on the particular application. When the contact modules 144 are stacked in the connector body 142, the contact sub-assemblies 152 may also be aligned in rows.

It should be understood, however, that the cable connector 114 described above and illustrated in the drawings is only one example of a cable connector that may be incorporated into embodiments set forth herein. In alternative embodiments, the communication device 102 (FIG. 1) includes other configurations or types of electrical connectors. In other embodiments, the communication device 102 includes only a single cable connector or includes only the contact assembly 120.

Figure 5:
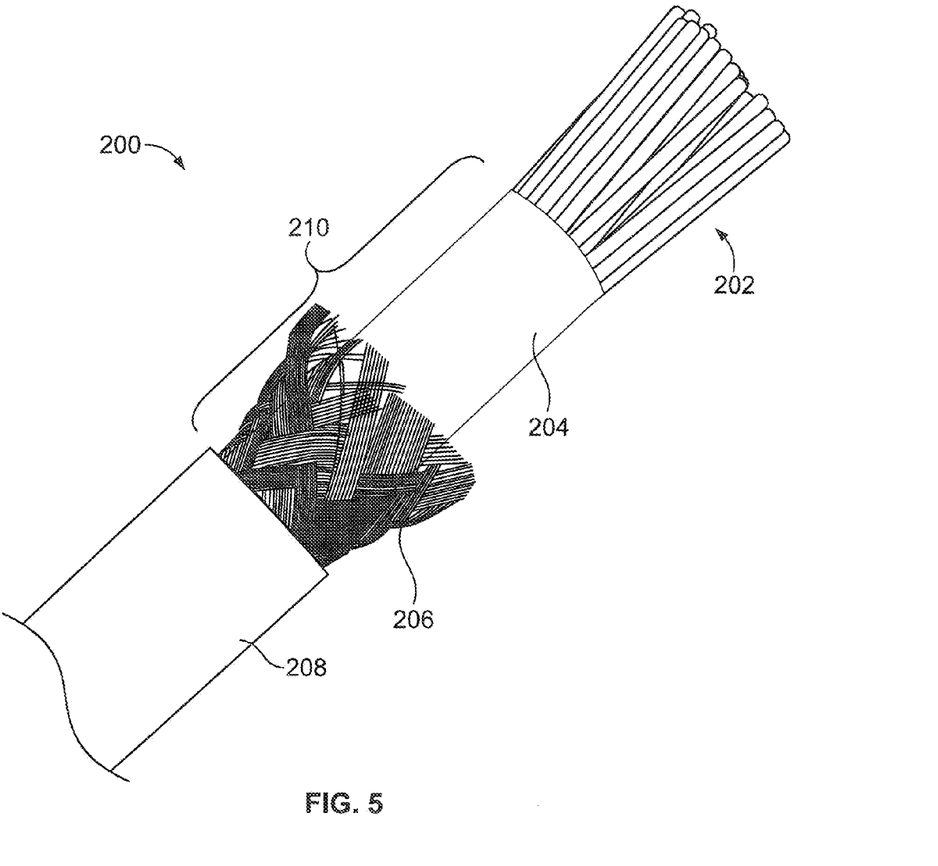
FIG. 5 is an image of an end of a cable harness that may be used with the cable assembly of FIG. 1.

FIG. 5 is an image of an end of a cable harness 200, which may be incorporated with cable assemblies, such as the cable assembly 100 (FIG. 1). The cable harness 125 (FIG. 2) may be similar or identical to the cable harness 200. For example, the cable harness 200 may include a plurality of communication cables 202, a conductive foil 204 that surrounds the communication cables 202, a conductive braid 206 that surrounds the conductive foil 204, and a protective jacket 208 that surrounds the conductive braid 206. In some embodiments, the conductive foil 204 and the conductive braid 206 may constitute a shielding layer 210 that is configured to shield the communication cables 202 from electromagnetic interference from adjacent cable harnesses (not shown). In other embodiments, the shielding layer 210 may include only the conductive foil 204 or only the conductive braid 206. Each of the communication cables 202 may include a single insulated wire or multiple insulated wires, such as the insulated wires 244 (shown in FIG. 6).

FIG. 6 illustrates a cross-section of the external segment 160 of the cable harness 125. As described above, the cable harness 125 may be similar or identical to the cable harness 200 (FIG. 5). The cable harness 125 includes a central spacer 220 having the central axis 130 extending therethrough. The cable harness 125 also includes a plurality of the communication cables 140 positioned around the central spacer 220, a shielding layer 224 that surrounds the communication cables 140, and a protective jacket 226 that surrounds the shielding layer 224. The protective jacket has an exterior surface 227, and the shielding layer 224 has an outer surface 268. For illustrative purposes, only a designated number of communication cables 140 are shown. However, it should be understood that any number of communication cables 140 may be selected based on the application of the cable harness 125. In the illustrated embodiment, the shielding layer 224 includes a conductive foil 230 that surrounds the communication cables 140 and a conductive braid 232 that surrounds the conductive foil 230. In other embodiments, the shielding layer 224 may include only the conductive foil 230 or only the conductive braid 232.

The shielding layer 224 defines a cable passage 242 where the communication cables 140 extend through the cable harness 125. In an exemplary embodiment, each of the communication cables 140 includes a pair of insulated wires 244 that are surrounded by a cable jacket 245. Although not shown, the communication cable 140 may also include a shielding or foil layer that surrounds the insulated wires 244 and is surrounded by the cable jacket 245. Each of the insulated wires 244 includes a signal conductor 246 and an insulative layer 248 that surrounds the corresponding signal conductor 246. Optionally, the communication cable 140 may include a drain wire 249 that extends along the insulated wires 244. In an exemplary embodiment, the communication cables 140 are twin axial cables having two insulated wires 244. In other embodiments, the communication cable 140 may include a twisted-pair of insulated wires 244. The signal conductors 246 may be configured to convey differential signals. Yet in other embodiments, one or more of the communication cables 140 may include more than two insulated wires.

In particular embodiments, the cable harness 125 is configured to hold numerous insulated wires 244 and/or communication cables 140. For instance, the cable harness 125 may include at least eight (8) insulated wires 244 or, more specifically, at least twelve (12) insulated wires 244. In particular embodiments, the cable harness 125 may include at least twenty-four (24) insulated wires 244 or, more particularly, at least forty-eight (48) insulated wires 244. Likewise, the cable harness 125 may include at least four (4) communication cables 140, at least six (6) communication cables 140, at least twelve (12) communication cables 140, or at least six (24) communication cables 140.

Figure 7:
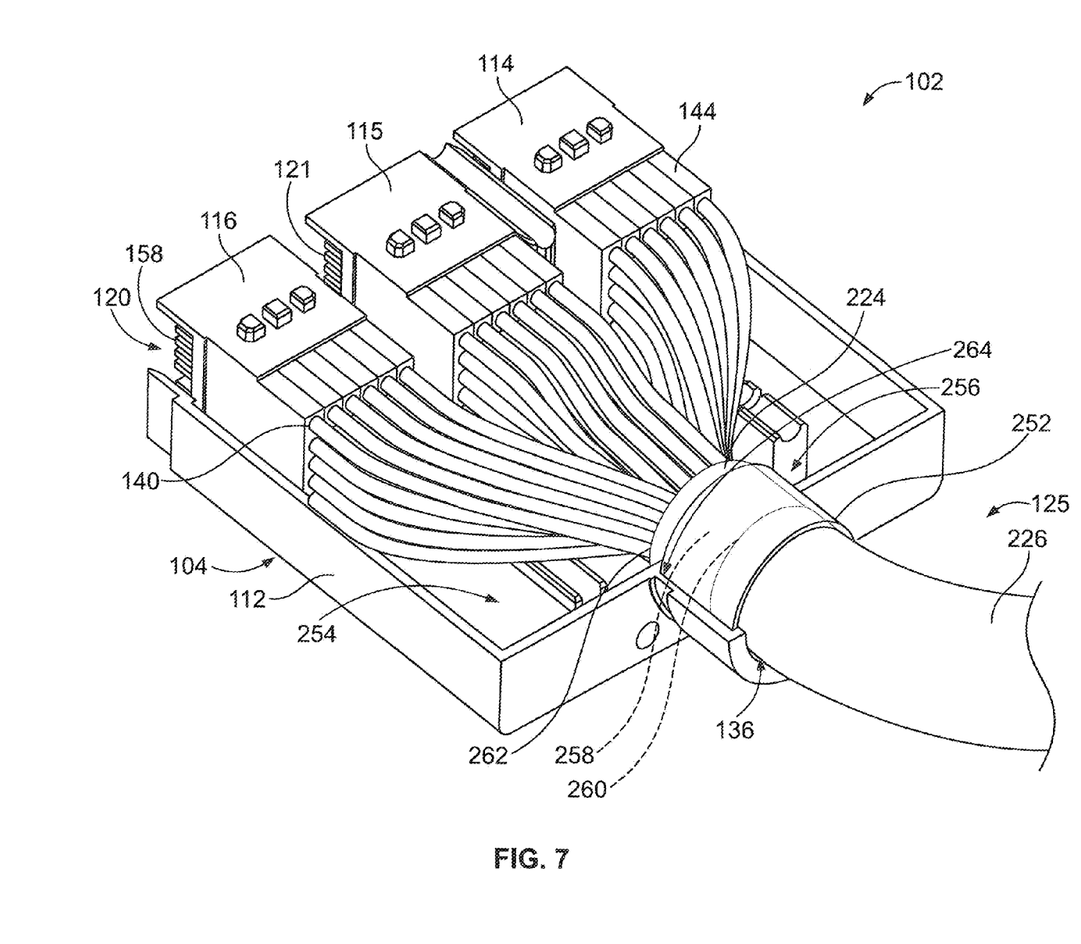
FIG. 7 is a perspective view of the communication device with a portion of an assembly housing removed to illustrate an internal cavity of the communication device.

FIG. 7 illustrates an exposed view of the communication device 102. In particular, FIG. 7 shows a perspective view of the second housing shell 112 that is open-sided and has a portion of the cable harness 125 disposed therein. The first housing shell 110 (FIG. 1) is not shown in FIG. 7 in order to show the internal cavity 254 of the assembly housing 104. The loading passage 136 provides access to the internal cavity 254 and allows the cable harness 125 to be positioned therein. As shown, the cable harness 125 includes a conductive adhesive layer 252 that is configured to electrically couple the shielding layer 224 of the cable harness 125 to the assembly housing 104. Optionally, the adhesive layer 252 may also surround the protective jacket 226. In some embodiments, the adhesive layer 252 not only electrically couples the shielding layer 224 to the assembly housing 104, but also provides strain relief for the communication cables 140 and/or the insulated wires 244 (FIG. 6). In an exemplary embodiment, the adhesive layer 252 has a substantially cylindrical structure.

The internal segment 256 of the cable harness 125 represents a segment of the cable harness 125 that is disposed within the assembly housing 104. The internal segment 256 includes an exposed portion 258 of the shielding layer 224 that clears an end or edge 260 of the protective jacket 226. In the illustrated embodiment, the end 260 of the protective jacket 226 is disposed within the loading passage 136 and located underneath the adhesive layer 252. In other embodiments, however, the adhesive layer 252 may not surround the end 260 and/or the end 260 may not be disposed within the loading passage 136.

As shown in FIG. 7, a section of the exposed portion 258 is surrounded by the adhesive layer 252 and another section of the exposed portion 258 clears the adhesive layer 252. The communication cables 140 may clear an end or edge 262 of the shielding layer 224 and extend to the corresponding cable connectors 114-116. The communication cables 140 are positioned within the internal cavity 254 and extend to the contact modules 144 of the cable connectors 114-116. The communication cables 140 may be terminated to corresponding electrical contacts 121 of the corresponding contact assemblies 120. More specifically, the signal conductors 246 (FIG. 6) may be terminated to the signal contacts 156 (FIG. 3) and the drain wires 249 (FIG. 6) may be terminated to the ground contacts 158.

When the first housing shell 110 (FIG. 1) and the second housing shell 112 are joined to form the assembly housing 104, the assembly housing 104 surrounds the cable connectors 114-116 and the communication cables 140 within the internal cavity 254. In an exemplary embodiment, the assembly housing 104 and the cable harness 125 also define a passage void 264 when the internal segment 256 is positioned within the loading passage 136. The adhesive layer 252 occupies at least some of the passage void 264. In particular embodiments, the adhesive layer 252 may occupy an entirety of the passage void 264.

The adhesive layer 252 has conductive properties such that the adhesive layer 252 electrically couples the shielding layer 224 to the assembly housing 104. For example, the adhesive layer 252 may comprise a thermoplastic material that is capable of being melted into a flowable state. In some embodiments, the thermoplastic material may be similar to a hot-melt adhesive or hot glue. Conductive elements may be added to the thermoplastic material to provide a conductive thermoplastic material. By way of example only, the thermoplastic material may include at least one of an ethylene-vinyl aceate, ethylene-acrylate, polyolefin, polyamide, polyester, polyurethane, polymer, or elastomer. Exemplary thermoplastic materials may include Henkel Macromelt®, such as the OM 638 product line, or 3M™ Jet-Melt™, such as the 3779 product line. The conductive elements may include at least one of copper dendrites, silver dendrites, or tin powder. In some embodiments, the adhesive layer 252 has elastic properties that permit the adhesive layer 252 to be compressed. In such embodiments, the first and second housing shells 110, 112 may compress the adhesive layer 252 toward the shielding layer 224.

It should be noted that the adhesive layer 252 may have different shapes and/or varying dimensions in other embodiments. For example, the adhesive layer 252 may have a cross-section taken transverse to the central axis 130 that has a square shape, rectangular shape, or other polygonal shape. Moreover, the adhesive layer 252 is not required to have a uniform cross-sectional shape throughout. For example, the cross-sectional shape of the adhesive layer 252 may change as the adhesive layer extends from the edge 260 to the edge 262.

Figure 8:
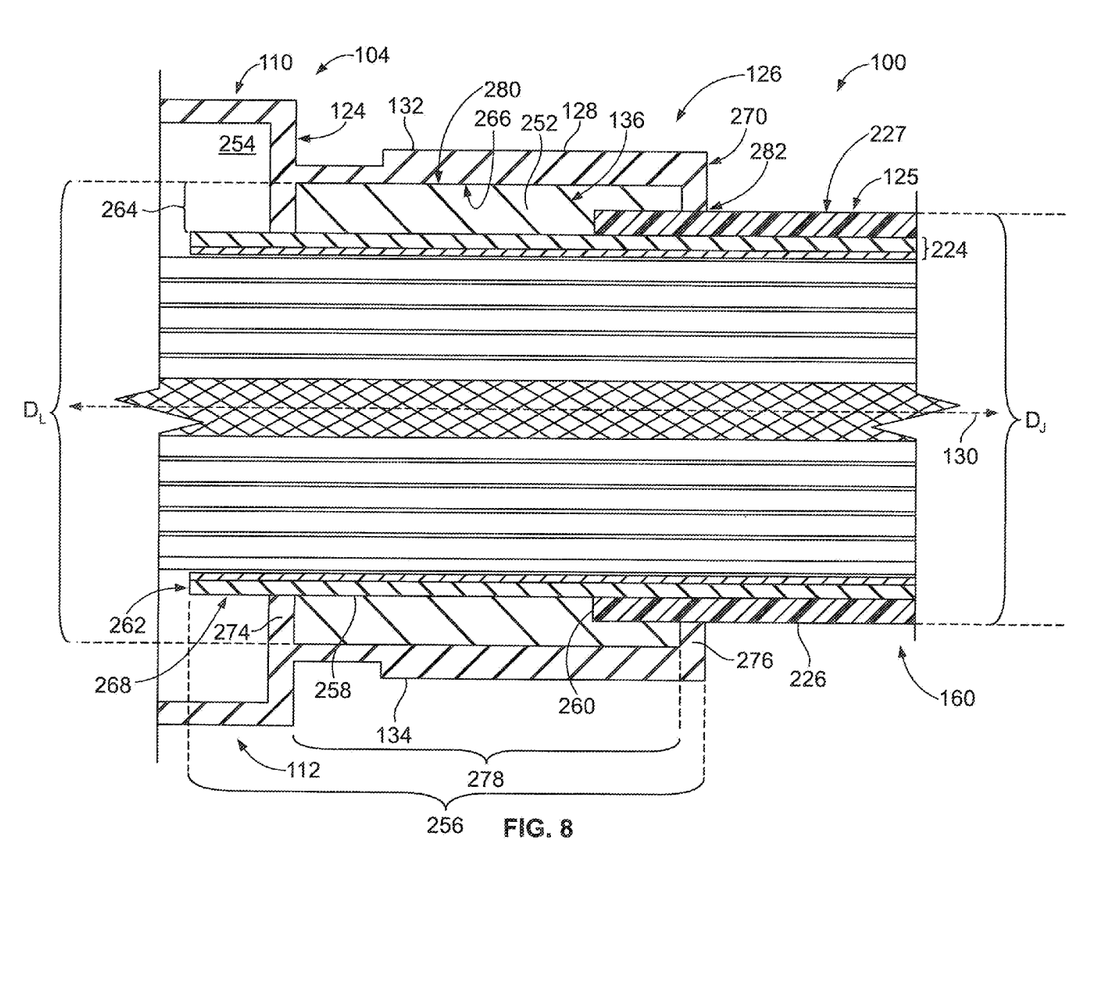
FIG. 8 is a side cross-section of the cable assembly of FIG. 1 illustrating a loading passage for the cable harness.

FIG. 8 is a side cross-section of the cable assembly 100 through the cable port 126. The internal segment 256 of the cable harness 125 is located within the internal cavity 254 and the loading passage 136. In an exemplary embodiment, the port wall 128 is formed from the first and second wall portions 132, 134 of the first and second housing shells 110, 112. Alternatively, the port wall 128 may be a single wall structure or may be formed from more than two wall portions. The assembly housing 104 includes an interior surface 266 that extends along the port wall 128 to define the loading passage 136. The interior surface 266 extends parallel to and also circumferentially around the central axis 130. At least a portion of the passage void 264 is defined between the interior surface 266 and the outer surface 268 of the shielding layer 224. In some embodiments, a portion of the passage void 264 may be defined between the interior surface 266 and the exterior surface 227 of the protective jacket 226.

As shown in FIG. 8, the internal segment 256 includes the end 262 of the shielding layer 224. The communication cables 140 project beyond the end 262 to terminate to corresponding electrical contacts 121 (FIG. 3). The internal segment 256 also includes the end 260 of the protective jacket 226. The cable port 126 projects from the back wall 124 to a port end 270. The port end 270 defines an access opening 282 that is sized and shaped to receive the cable harness 125. In the illustrated embodiment, the cable port 126 is an extension of the assembly housing 104 that projects away from the back wall 124. In alternative embodiments, the port wall 128 may be disposed within the assembly housing 104 such that the port end 270 is located within the assembly housing 104 or is flush with the back wall 124.

The loading passage 136 extends lengthwise along the central axis 130. The assembly housing 104 has a first rim 274 that extends radially inward from the interior surface 266 toward the central axis 130, and a second rim 276 that extends radially inward from the interior surface 266 toward the central axis 130. The first and second rims 274, 276 are separated by a distance 278 along the central axis 130. The first rim 274 directly engages the outer surface 268 of the shielding layer 224, and the second rim 276 directly engages the exterior surface 227 of the protective jacket 226.

The passage void 264 may be defined as a space between the interior surface 266 of the assembly housing 104, the first and second rims 274, 276, and the internal segment 256 of the cable harness 125 within the loading passage 136. The adhesive layer 252 is disposed within the passage void 264 and is coupled to the exposed portion 258 of the shielding layer 224. The adhesive layer 252 may extend between the shielding layer 224 and the assembly housing 104. The adhesive layer 252 engages the assembly housing 104. For example, in an exemplary embodiment, the adhesive layer 252 is bonded to both the shielding layer 224 and the interior surface 266 of the assembly housing 104. In other embodiments, the adhesive layer 252 may bond to the shielding layer 224 and interface or engage with the interior surface 266 of the assembly housing 104. In the illustrated embodiment, the adhesive layer 252 extends around and directly engages the end 260 of the protective jacket 226 and a portion of the exterior surface 227 of the protective jacket 226. Accordingly, the adhesive layer 252 may secure the shielding layer 224 and the protective jacket 226 to the assembly housing 104 and establish an electrical pathway between the shielding layer 224 and the assembly housing 104. In other embodiments, the adhesive layer 252 may be secured to the shielding layer 224, but only engage with the assembly housing 104 without securing or bonding to the assembly housing 104. In such embodiments, the adhesive layer 252 also establishes an electrical pathway between the shielding layer 224 and the assembly housing 104.

As shown in FIG. 8, the external segment 160 of the cable harness 125 has a diameter $D_J$ that is measured between diametrically opposite portions of the exterior surface 227 of the protective jacket 226. The access opening 282 may have a diameter that is substantially equal to the diameter $D_L$. The internal segment 256 has a diameter $D_L$ that is measured between diametrically opposite portions of an outer surface 280 of the adhesive layer 252. In an exemplary embodiment, the diameter $D_L$ is greater than the diameter $D_J$. In such embodiments, the second rim 276 may function as a positive stop that prevents the cable harness 125 from being withdrawn from the loading passage 136.

Various manufacturing processes may be used to provide the adhesive layer 252. For example, in some embodiments, after the assembly housing 104 is assembled and the internal segment 256 is positioned within the loading passage 136, a melted or otherwise flowable form of the conductive thermoplastic material may be injected into the passage void 264. In such embodiments, the assembly housing 104 may function as a mold that directs the flow of the melted material during the injection process. During the injection process, a pressure of the melted material within the loading passage 136 may cause the melted material to flow into and occupy all or nearly all available space therein. Accordingly, the melted material may intimately engage the interior surface 266 of the assembly housing 104 and the shielding layer 224. In some embodiments, the melted material may also engage the exterior surface 227 of the protective jacket 226. When the melted material cures, the adhesive layer 252 may intimately engage the assembly housing 104, the shielding layer 224, and the protective jacket 226.

Alternatively, the cable harness 125 may be manufactured separately and then inserted into the loading passage 136. For example, the exposed portion 258 of the cable harness 125 may be positioned within a cavity of a mold. The cavity of the mold may have an identical size and shape relative to the loading passage 136. The melted material may be injected into the cavity of the mold. Again, a pressure of the melted material may cause the melted material to flow into and occupy all or nearly all available space within the cavity of the mold. The melted material may cure to form the adhesive layer 252.

The cable harness 125, now having the adhesive layer 252, may be removed from the mold and positioned within the assembly housing 104. For example, the pre-formed cable harness 125 may be positioned within the second housing shell 112 as shown in FIG. 7. Each of the first housing shell 110 (FIG. 1) and the second housing shell 112 may form a portion of the loading passage 136. The first housing shell 110 may be positioned over the second housing shell 112 to cover the internal segment 256 of the cable harness 125. As the first and second housing shells 110, 112 are joined together, the first and second housing shells 110, 112 may compress the adhesive layer 252 therebetween. In particular embodiments, the first and second housing shells 110, 112 may compress the adhesive layer 252 radially inward toward the central axis 130.

For embodiments that include the conductive braid 232 (FIG. 6), the pressure of the melted material during the injection process may also cause the melted material to flow into voids or gaps of the conductive braid 232. When the melted material cures, the conductive thermoplastic material of the adhesive layer 252 may at least partially impregnate the conductive braid 232. In such embodiments, the adhesive layer 252 may be secured more strongly to the shielding layer 224 than, for example, a shielding layer that only includes a conductive foil. As such, the conductive braid 232 may increase the force necessary to remove the cable harness 125 from the loading passage 136.

In some embodiments, the adhesive layer 252 may also secure the shielding layer 224 and the protective jacket 226 to each other. For example, the melted material may flow within an interface between the shielding layer 224 and the end 260 of the protective jacket 226, which is an area that can be susceptible to gap formation during operation.

Regardless of the manufacturing method, the conductive properties of the adhesive layer 252 may provide a low resistance electrical pathway between the shielding layer 224 and the assembly housing 104. Moreover, for some embodiments, a pressure of the melted material during the injection process may compress the shielding layer 224 radially inward toward the central axis 130 such that the shielding layer 224 compresses the communication cables 140 to one another within the cable passage 242. As described above, the interior surface 266 of the assembly housing 104 may compress the adhesive layer 252 against the shielding layer 224. Accordingly, the adhesive layer 252 may also provide strain relief that protects the terminations between the signal conductors 246 (FIG. 6) and the signal contacts 156 (FIG. 4) and between the drain wires 249 (FIG. 6) and the ground contacts 158 (FIG. 4).

For some embodiments, the cable assembly 100 may require fewer components than known cable assemblies. For example, the cable assembly 100 does not require a ferrule, which may reduce manufacturing complexity and costs. In alternative embodiments, however, the cable assembly 100 may also include a ferrule.

For embodiments in which the adhesive layer 252 at least partially impregnates the conductive braid 232 (FIG. 6), the adhesive layer 252 may encapsulate strands of the conductive braid 252 and hold the strands within a designated space. The adhesive layer 252 may prevent the strands from electrically coupling to other surfaces and causing electrical shorts. In some embodiments, the edge 262 of the shielding layer 224 is surrounded by the adhesive layer 252. More specifically, the adhesive layer 252 may extend beyond and clear the edge 262 of the shielding layer 224. In such embodiments, the conductive braid 232 and, optionally, the conductive foil 230 may be surrounded by or enclosed within the adhesive layer 252 such that the strands of the conductive braid 232 or portions of the conductive foil 230 are not exposed.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the inventive subject matter should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

What is claimed is:
1. A cable assembly comprising:
 a plurality of discrete cable connectors that each include a contact array of electrical contacts that are configured to engage respective contacts of a respective mating connector during a mating operation, the electrical contacts including signal and ground contacts;

a cable harness comprising insulated wires, a shielding layer that surrounds the insulated wires, and a protective jacket that surrounds the shielding layer, the shielding layer including an exposed portion that clears an end of the protective jacket; and an assembly housing having an internal cavity and a loading passage that provides access to the internal cavity, the cable connectors being partially disposed in the internal cavity and positioned along a mating side for engaging the mating connectors, the exposed portion of the shielding layer being positioned within the loading passage, the insulated wires extending through the internal cavity and being terminated to corresponding electrical contacts of the contact array, wherein the cable harness includes an adhesive layer that is coupled to the exposed portion of the shielding layer, the adhesive layer being engaged with an interior surface of the assembly housing along the loading passage, the adhesive layer comprising a conductive thermoplastic material that electrically couples the shielding layer to the assembly housing.

2. The cable assembly of claim 1, wherein the adhesive layer surrounds the end of the protective jacket and secures the protective jacket to the assembly housing.

3. The cable assembly of claim 1, wherein the cable harness includes an internal segment that is positioned within the loading passage and includes the adhesive layer and an external segment that is positioned outside of the assembly housing, the external segment having a first diameter that is measured between diametrically opposite portions of an exterior surface of the protective jacket, the internal segment having a second diameter that is measured between diametrically opposite portions of an outer surface of the adhesive layer, the second diameter being greater than the first diameter.

4. A cable assembly comprising:
a contact assembly including electrical contacts that are configured to engage respective contacts of a mating connector during a mating operation;
a cable harness comprising insulated wires, a shielding layer that surrounds the insulated wires, and a protective jacket that surrounds the shielding layer, the shielding layer including an exposed portion; and
an assembly housing having an internal cavity and a loading passage that provides access to the internal cavity, the exposed portion of the shielding layer being positioned within the loading passage, the insulated wires extending through the internal cavity and being terminated to corresponding electrical contacts of the contact assembly, wherein the cable harness includes an adhesive layer that is coupled to the exposed portion of the shielding layer, the adhesive layer being engaged with an interior surface of the assembly housing along the loading passage, the adhesive layer comprising a conductive thermoplastic material that electrically couples the shielding layer to the assembly housing;
wherein the loading passage extends lengthwise along a central axis, the assembly housing having a first rim that extends radially inward toward the central axis and a second rim that extends radially inward toward the central axis, the first rim directly engaging the cable harness and the second rim directly engaging the protective jacket, the first and second rims being separated by a distance along the central axis, wherein the interior surface of the assembly housing, the first and second rims, and the cable harness define a passage void, the adhesive layer being located within the passage void, the first rim being positioned between the passage void and the internal cavity.

5. The cable assembly of claim 4, wherein the adhesive layer compresses the shielding layer radially inward toward the insulated wires, the adhesive layer being compressed between the shielding layer and the interior surface of the assembly housing.

6. The cable assembly of claim 1, wherein the shielding layer includes a conductive foil that surrounds the insulated wires and a conductive braid that surrounds the conductive foil, the adhesive layer at least partially impregnating the conductive braid.

7. The cable assembly of claim 1, wherein the shielding layer includes a conductive braid that surrounds the insulated wires, the conductive braid having an edge, the adhesive layer at least partially impregnating the conductive braid and clearing the edge of the conductive braid such that the adhesive layer surrounds the edge of the conductive braid.

8. The cable assembly of claim 4, wherein the assembly housing includes first and second housing shells, each of the first and second housing shells defining a portion of the loading passage, the adhesive layer being compressed between the first and second housing shells.

9. A cable harness comprising:
a plurality of insulated wires;
a shielding layer including a conductive foil that surrounds the insulated wires and a conductive braid that surrounds the conductive foil;
a protective jacket that surrounds the shielding layer, wherein the shielding layer includes an exposed portion that clears an end of the protective jacket, the insulated wires projecting beyond an end of the shielding layer for terminating to corresponding electrical contacts; and
an adhesive layer coupled to the exposed portion of the shielding layer, the adhesive layer comprising a conductive thermoplastic material that at least partially impregnates the conductive braid.

10. The cable harness of claim 9, wherein the cable harness includes an internal segment that has the adhesive layer and an external segment, the external segment having a first diameter that is measured between diametrically opposite portions of an exterior surface of the protective jacket, the internal segment having a second diameter that is measured between diametrically opposite portions of an outer surface of the adhesive layer, the second diameter being greater than the first diameter.

11. The cable harness of claim 9, wherein the adhesive layer forms a substantially cylindrical structure that surrounds the end of the protective jacket.

12. The cable harness of claim 9, wherein the cable harness includes communication cables that have the insulated wires, the communication cables being at least one of twisted-pair cables or parallel-pair cables.

13. The cable harness of claim 9, wherein the cable harness includes at least twenty-four communication cables being at least one of twisted-pair cables or parallel-pair cables, each of the communication cables including at least two of the insulated wires and having a cable jacket that surrounds the at least two insulated wires, the communication cables configured to transmit data signals at 10 gigabits per second or more.

14. The cable harness of claim 9, wherein the adhesive layer has an elastic property such that the adhesive layer is capable of being compressed inward toward the shielding layer.

15. The cable harness of claim 9, wherein the conductive braid has an edge, the adhesive layer clearing the edge of the conductive braid such that the adhesive layer surrounds the edge of the conductive braid.

16. The cable assembly of claim 4, wherein the shielding layer includes a conductive foil that surrounds the insulated wires and a conductive braid that surrounds the conductive foil, the adhesive layer at least partially impregnating the conductive braid.

17. The cable assembly of claim 4, wherein the shielding layer includes a conductive braid that surrounds the insulated wires, the conductive braid having an edge, the adhesive layer at least partially impregnating the conductive braid and clearing the edge of the conductive braid such that the adhesive layer surrounds the edge of the conductive braid.

18. The cable assembly of claim 1, wherein the cable connectors are high-speed differential pair cable connectors that are capable of transmitting data signals at 10 gigabits per second or more.

19. The cable assembly of claim 1, wherein each of the cable connectors include a plurality of contact modules stacked relative to each other, each of the contact modules including a row of contact sub-assemblies and each contact sub-assembly including a pair of signal contacts and a ground shield.

20. The cable assembly of claim 1, wherein the cable harness includes at least twenty-four communication cables, each of the communication cables including at least two of the insulated wires and having a cable jacket that surrounds the at least two insulated wires, the internal cavity including an open space, the communication cables extending through the open space to the corresponding electrical contacts.

* * * * *